United States Patent
Stein et al.

(10) Patent No.: US 8,660,900 B2
(45) Date of Patent: Feb. 25, 2014

(54) MULTI-SITE MESSAGE SHARING

(75) Inventors: Jeremy S. Stein, Beachwood, OH (US);
Mark D. Bonham, Rye, NH (US);
Daniel Alexander, West Roxbury, MA (US); Eugene E. Pettinelli, Sudbury, MA (US)

(73) Assignee: Perogo, Inc., Cambridge, MA (US)

( * ) Notice: Subject to any disclaimer, the term of this patent is extended or adjusted under 35 U.S.C. 154(b) by 1429 days.

(21) Appl. No.: 11/486,187

(22) Filed: Jul. 13, 2006

(65) Prior Publication Data

US 2007/0043617 A1 Feb. 22, 2007

Related U.S. Application Data

(60) Provisional application No. 60/698,664, filed on Jul. 13, 2005.

(51) Int. Cl.
*G06Q 30/00* (2012.01)

(52) U.S. Cl.
USPC ........................................ 705/14.73

(58) Field of Classification Search
USPC ........................................ 705/14.73
See application file for complete search history.

(56) References Cited

U.S. PATENT DOCUMENTS

| | | | | |
|---|---|---|---|---|
| 6,266,649 B1 * | 7/2001 | Linden et al. | | 705/26 |
| 6,405,175 B1 * | 6/2002 | Ng | | 705/14 |
| 6,525,747 B1 | 2/2003 | Bezos | | |
| 6,859,909 B1 * | 2/2005 | Lerner et al. | | 715/203 |
| 6,963,848 B1 * | 11/2005 | Brinkerhoff | | 705/10 |
| 2002/0010628 A1 | 1/2002 | Burns | | |
| 2002/0169853 A1 | 11/2002 | Grossman | | |
| 2003/0033292 A1 * | 2/2003 | Meisel et al. | | 707/3 |
| 2004/0167928 A1 | 8/2004 | Anderson et al. | | |
| 2004/0193484 A1 * | 9/2004 | Allen | | 705/14 |
| 2005/0021397 A1 | 1/2005 | Cui et al. | | |
| 2005/0055271 A1 | 3/2005 | Axe et al. | | |
| 2005/0076051 A1 | 4/2005 | Carobus et al. | | |
| 2005/0114198 A1 | 5/2005 | Koningstein et al. | | |
| 2007/0118794 A1 * | 5/2007 | Hollander et al. | | 715/512 |

OTHER PUBLICATIONS

PointRoll, Inc. website, Jun. 28, 2005 (www.pointroll.com) selected extracts.
European Patent Office, "European Search Report", EP Application No. 06787066.7, Jul. 6, 2010.

* cited by examiner

*Primary Examiner* — Daniel Sorkowitz
(74) *Attorney, Agent, or Firm* — Modern Times Legal; Robert J. Sayre

(57) ABSTRACT

A computer application is used for the serving and creation of user-annotated web pages, which may include associated advertisements, to client devices. The user is able to submit comments to one or more web servers wherein the web server or servers appends the submitted comment or comments and updates them for use and display on one or more web pages at one or more client devices. The comments are also distributed for viewing or listening, potential annotation, and update by other users viewing the same or related annotations across multiple websites. Annotated advertisements are an embodiment of the invention.

32 Claims, 4 Drawing Sheets

| AD ID | Publisher ID | Views | Clicks | Payment |
|---|---|---|---|---|

4A

| IP Address | Country | Date | Time | Site |
|---|---|---|---|---|

MULTI-SITE MESSAGE SHARING

RELATED APPLICATIONS

This application claims priority to, and incorporates by reference, the entire disclosure of U.S. Provisional Patent Application No. 60/698,664, filed on Jul. 13, 2005.

BACKGROUND

1. Field

The present invention is directed to systems and methods for user annotation of web pages and other modes of digital content delivery via a network such as the Internet or other digital protocol networks.

2. Definitions

User Comment(s): comment(s), typically typed or otherwise entered into a web browser or similar computer program interface (which is enable to communicate by means such as audio, tactile or visual) by a user, who may but need not be a potential customer for products or services on a web page presented to the user by the web browser or other program. Typically, the comments would be about the subject of an advertisement or other content of the web page, or about the comments of others who have commented on the advertisement or other content. These comments may include voice, pictures, video, text, hyperlinks, gestures, and other forms of communications or content, or may combine two or more such components (e.g. mashups, Google tools, etc.), and may be interactive, in that the user my enter his/her own comments, including voice, pictures, video, gestures, etc. as well as receive comments, including voice, pictures, video, gestures, etc. This includes predefined images, text, video which can be selected, combined, deleted, modified, updated or added to, etc.

Web: the Internet or other network mode of digital content delivery.

Web Content: information of any sort delivered via the Web to any type of user interface device.

Web Page: a single instance of Web Content such as may be presented to a user in a browser, cell phone, or other interface device.

Viewing: a method of interfacing with a Web page typically by visual means, but may also include other means depending on the particular system in use, such as listening, feeling, tasting, or seeing, or any combination of these.

Editing: the process of manipulating, adding to, and/or deleting content of any type.

Manipulating: the process of adding to, modifying or otherwise altering content of any type.

Ad Server: a computer system which enables the distribution of one or more advertisements.

Annotatable Server: a computer system which enables the distribution of one or more annotated web pages or annotated sections of a web page.

Annotated Content: content used on an annotated web page or sections of a web page, which annotated content may initially be blank.

Annotated Advertisement: an advertisement which may comprise features such as advertisement text, advertisement images, advertisement videos, advertisement audio, and user comments.

Annotatable Web page: a web page which allows users to enter comments.

Annotated Web page: a web page on which users have entered comments.

Annotatable Section of a Web page: a section of a web page which allows users to enter comments.

Annotated Section of a Web page: a section of a web page on which users have entered comments.

Client Device: a user interface device such as a personal or other computer or computing device running a browser, plug-in, or other software permitting access to a web page, telephone, personal digital assistant (PDA), cell phone, two-way interactive computing device, etc.

Purchase Information: information such as billing information, shipping information, and/or other contact information for making a purchase on a website.

Purchasing an item or items through an advertisement: purchasing the desired item as shown, listed, described or otherwise presented in the advertisement, by entering purchase information, without leaving or being taken to another website.

Server System: an internal or external system means for purchases to be fulfilled.

Change to an advertisement: an addition to, deletion of, or substitution made by a user of the content of the advertisement or of one, some or all of the comments thereon.

Electing user: a user who signs up for a service which may include but is not limited to sending an email when a new annotation or comment is posted on an advertisement.

Wiki: a system of web pages, servers, and databases, typically connected to the Internet, but which may also be internal, which enables documents to be written and edited collectively, e.g., co-authoring.

Mashup: an application that is able to integrate data from multiple sources (one or more web services).

Tagging: assigning a user description to a bookmark, hyperlink, website, product, advertisement, or other web content.

BACKGROUND INFORMATION

Nearly one billion people worldwide may use the Internet regularly for such purposes as gathering information, communicating with others, and making purchases. The Internet has enabled numerous possibilities for user to user communication through devices such as email, Internet Relay Chat (IRC), whiteboards, instant messaging, wikis, weblogs (blogs), message boards, user groups, social networks, video conferences, and voice over internet protocol (VoIP) telephony. Online communication has been a relatively inexpensive and effective way for users across the globe to contact and maintain relationships with one another. With so many users, the Internet has become rich with informative documents and other useful content. Many users actively maintain websites for personal and business use.

With such a vast potential market, some website publishers seek ways to profit from their audiences by placing advertisements on their websites. Some advertisers have found this to be appealing because it may allow them an easy and effective way to target specific audiences. A banner ad appeared on the HotWired Internet site in 1994. Shortly thereafter, advertising networks such as DoubleClick, which uses ad servers to distribute their inventory of banner ads to publisher websites which are a part of their network, were started. The advertising network company and the publisher may share the revenue derived from the advertisement, and that revenue may be calculated based on metrics such as cost per click (CPC), and cost per mille (CPM) to the advertisers.

As the Internet grew, website search engines appeared which allowed a user to quickly search the Internet to find information. In 1997, Goto.com (which subsequently became Overture) created a search engine advertising service. This service allowed advertisers to bid for placement on the displayed search page based on keywords entered into a search engine by the potential viewer of the advertisement. This could facilitate the display of advertisements that were relevant to the user's interests. The highest bidder's advertisement could be listed first, with the second highest bidder's advertisement listed second (and so forth).

Keyword matching technology evolved, and allowed not only query based matches, but entire website content matching. Companies such as Google, Overture, Kanoodle, and FindWhat incorporated search engine marketing and content scan marketing into their offerings. Algorithms were written to match keywords embedded in articles, which allowed advertisements to be identified which were relevant to the content a user was viewing. Common forms of these advertisements are text ads and banner ads. Companies such as Vibrant Media may embed the advertisement in hyperlinks in the article text itself.

During the late 1990's, third party affiliate programs emerged. These programs might use a cost per action (CPA) model to charge advertisers. That is, an advertiser could be charged if a click-through led to a purchase of its product, or if a form were filled out, or based upon whatever else the advertiser elects as an "action." The affiliate and the publisher could split a commission paid by the advertiser. Cookies and network specific shopping carts could be used to track sales and other leads.

Behavioral marketing advertising became popular in 2000-2001. This method of advertising could display targeted advertisements not based upon content, but on the types of websites a user visited. A tracking cookie could be downloaded to a user's machine, and could send back information to the advertising network. When a user viewed a website on that advertiser's network, the advertisement that was shown could be based upon the user's interest. For example, if the user visited golfing websites then an advertisement for golf balls could be shown.

Another trend in online advertising is commonly known as "adware" or "spyware." Companies which engage in this type of advertising may download software to a user's computer via file sharing programs, browser add-ons, and drive-by downloads. This software may use principles similar to behavioral marketing to serve better targeted ads to the user. These advertisements may typically be in the form of "pop-up" or "pop-under" advertisements, displaying in windows separate from the web browser.

As the number of email accounts continues to rise, some marketers rely on email marketing using advertisements embedded into or attached to emails. Some or all of these advertisements, which are sent to millions of people daily, are considered to be "spam" by some users. Filters have been written to reduce the amount of email advertisements that users encounter. However, some companies have been successful in placing advertisements in newsletters and other large subscriber lists which may defeat these filters.

As weblogs have become increasingly popular, advertisers have begun posting advertisements in the form of comments on weblogs and message boards. This approach may be automated, being run by a computer script. As a result some publishers may make users enter a certain code in order for their comments to be posted. (This is commonly known as CAPTCHA—Completely Automated Public Turing test to tell Computers and Humans Apart.)

With the advent of broadband Internet use, some online advertising companies were able to pioneer new technologies with this faster service. Technologies such as flash, shockwave, and audio typically are associated with large files, which formerly took a long time to download. However, with the increasing number of high speed Internet users, advertisements utilizing these technologies (rich media) appeared. Other web technologies have emerged, including: (1) Unicast ads which run in a window separate from that of the browser (similar to a broadcast television commercial), with sound and video, (2) chat programs such as America Online's Instant Messenger, and MSN Messenger; and (3) weblogs, which use a syndication method called Really Simple Syndication (RSS), based on XML (a now standard form of data distribution) which may allow RSS aggregators to quickly organize and feed one's daily read to the user's browser. Some advertisers have learned the power of RSS feeds, and have built systems to insert advertisements into these feeds, and (4) tagging (e.g., www.delicious.com).

Despite these developments in advertisement delivery, many current online advertisements remain merely a direct message from the marketer, lacking consumer feedback and authenticity. Consumers receiving these advertisements may listen to these messages and use their best judgment to decipher them. They may seek out various other sources for authentic product reviews, and these may influence their decision to purchase goods or services. For example, users may see comments from other purchasers or users on websites such as Amazon and TripAdvisor and may use those comments to help them determine if the book, hotel or other product or service they are considering is worth purchasing. However, these comments may be limited in scope and may be constrained to situations in which others have previously come to that specific site and have entered their individual comments.

SUMMARY

The invention enables viewing online annotatable and annotated web pages, which may include associated advertisements (on a search page, for example) along with comments posted by oneself or by others from the same or other websites or from web pages on other websites, either contemporaneously or historically. For example, comments on an advertisement for a Ford Explorer™ might range from "Best car I ever had" to "Burns oil, burns gas, burns money". Means of filtering off-topic, vulgar, rude or profane comments (which filtering may be accomplished manually, at least initially) may be included. In one embodiment, comments can rotate so if the web page is refreshed, other, perhaps newer, comments can appear.

Annotated advertisements may provide consumers with useful product reviews and other information, all in one place, and may be considered more authentic, as the annotations are provided by other consumers and not by the marketer.

The information derived from these advertisements can also provide feedback for the advertiser. While multiple forms of data are currently available to online marketers, direct customer feedback from an advertisement is a substantial and unique contribution to the advertising strategies, e.g., customer feedback aggregation, that can be employed by advertisers. This facilitates consumer-to-marketer communication. Lead management is also made easier as a consumer can insert his email address into a comment, and a marketer can follow up that lead with an email or brochure.

A possible benefit of the present invention is the consumer-to-consumer interaction. A user on one website can interact with the users viewing the same advertisement or content on the same or on other different websites. The annotated advertisement may also be viewed in additional environments such as on mobile devices, in instant messaging, in online gaming, etc., or wherever the unannotated advertisement itself might be viewed.

Although current online advertising may offer effective targeting for marketers, it may pose a challenge for website publishers. If a user wants to learn more about an advertisement, or interact with the company, he/she may be required to click on the link and leave the publisher's site. Although the publisher may make money per click, they may want to retain their users for as long as possible. The present invention allows a user to fully interact with an advertisement and learn more about the associated product or service, all while remaining on the publisher's website. No additional click-throughs are required for more information, as a consumer can directly read or view reviews and other comments directly on the publisher's website, without compromising the content of the originating website (as some advertisements expand and cover website content).

In one embodiment, the advertisement itself may comprise advertiser input (image, text, audio, video), the system status, comments, and a way to participate in the is comments. The advertiser can submit an image, block of text or other content to the ad server to stimulate the comments. This component may be displayed in the advertisement and can link to the advertiser's website. Directly below the advertiser content, a system status field may be displayed. A field of this type may send a message to the user such as "thank you for your comment" after a user has submitted a comment. Below a system status indicator, the actual user comments may be displayed, along with fields where a user can participate. If a comment is in the form of video, audio, or pictures, a way to upload the file or call in can be made available.

The annotated advertisement and/or annotated web page are not limited to appendages; rather they can be in wiki format where a user may edit the content of the advertisement or web page itself. A user viewing a webpage may also have the option to purchase the desired item or items directly through one or more advertisements on that page, without having to go, or be taken, to another site to accomplish the purchasing action.

BRIEF DESCRIPTION OF THE DRAWINGS

The description below refers to the accompanying drawings, of which:

FIG. 4 illustrates a simple table structure for tracing vital statistics.

DETAILED DESCRIPTION OF AN ILLUSTRATIVE EMBODIMENT

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

In particular, although the invention is general in scope, and not limited to annotatable advertisements, for the purposes of explaining an embodiment, its use for annotating advertisements is described. This is not to imply any restriction on the generality of the invention.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems and methods. Additionally, the shapes and sizes of components are also exemplary and unless otherwise specified, can be altered without affecting the disclosed systems and methods.

Figure 1:
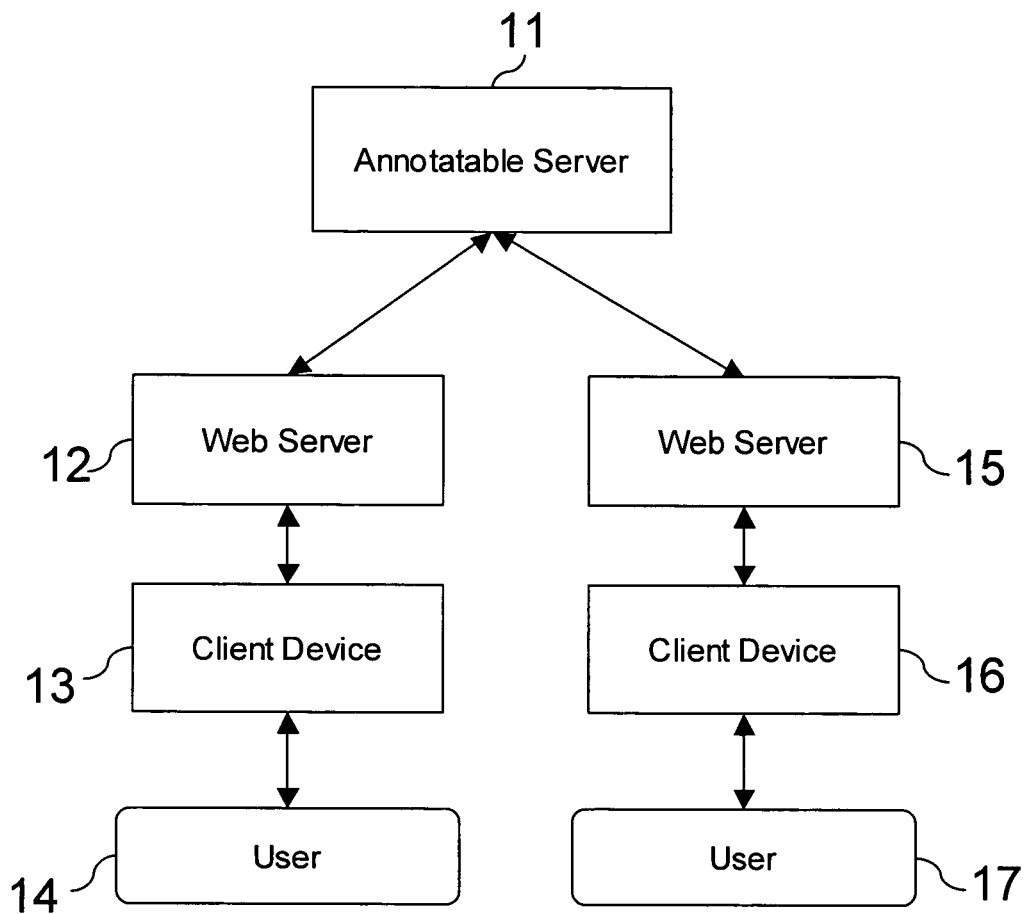
FIG. 1 is a high level diagram showing the system architecture for enabling annotatable web pages.

A system for enabling one or more annotatable or annotated web pages is shown in FIG. 1, where an annotatable server 11 distributes web pages with annotatable or annotated content to one or more users 14 and 17 who may view a web page in a client-side application on client devices 13 and 16. The web page which the one or more users are viewing can submit requests through one or more web servers 12 and 15 to the annotatable server 11 to provide the annotatable or annotated content within the viewed web page. The user 14 viewing annotatable or annotated content can interact with the content and other users 17 who previously viewed, are viewing or subsequently view the same or different annotatable or annotated content on the same or different web page or website.

Figure 2:
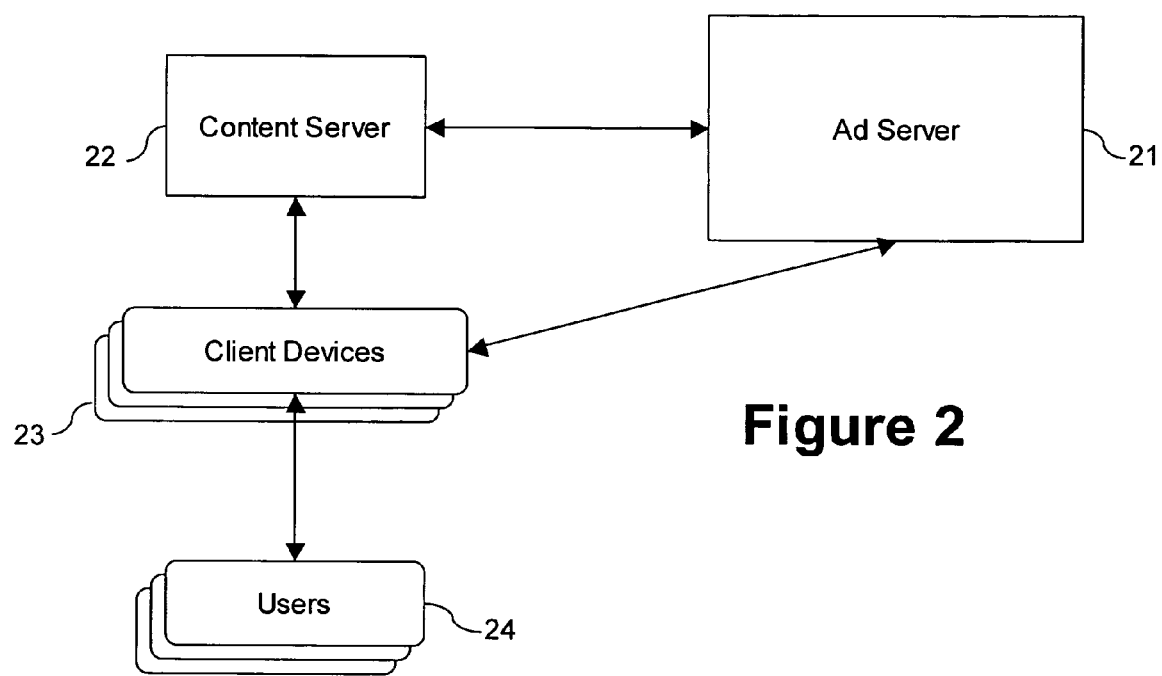
FIG. 2 is a high level diagram showing the system architecture for enabling one or more annotatable advertisements.

The system architecture for enabling an annotatable advertisement in an exemplary environment is shown in an embodiment in FIG. 2, comprising an ad server 21 distributing advertisements to requesting web pages being viewed on client devices 23. This system comprises: an ad server 21, a content server 22 and client devices 23. The ad server distributes the advertisements directly to subscribing publishers' websites to be viewed in client side applications (i.e., the advertisement may be rendered in a browser) on one or more client devices 23. If the ad server at any point gets overloaded, the advertisements can be delivered via content servers 22. Users 24, who are viewing advertisements on one or more client devices 23, may also interact with the advertisement by submitting comments to the ad server. The advertisement can be updated periodically in the client device with the appended comments. The updating process can occur based upon specific criteria such as time intervals or page refreshes.

Along with the advertisement, users 24 viewing a web page on a client device 23 can view comments made by other users who may be viewing or may have viewed the same or other websites displaying this advertisement. Users viewing an advertisement can interact with other past, present or future users by commenting, without leaving their original website. The comments can be sent back to an ad server 21 and redistributed to other web pages currently or subsequently displaying that advertisement. The user can have the option to click on a link to go to the advertiser's website, in certain cases (e.g. blogs) the originating content website, or a separately branded web page. Comments can be limited by the server by characters, number of words, or another parameter or set of parameters. Comments may also be available in full or in part on the separately served web page.

Client devices 23 can comprise three key functions: integration, interactivity, and user authentication. Integration consists of embedding or otherwise relating an advertisement to a webpage, allowing it to be viewed on a client device with the webpage. Interactivity allows a user at a client device to submit comments pertaining to the advertisement. User authentication comprises recognizing a user before allowing him or her to make a comment, such as by using cookies or CAPTCHA, which can help prevent spam. A client-side application (such as a browser, a browser plug-in, a browser toolbar plug-in, etc. on an end user's computer) may be used to support the serving of advertisements to the client device.

A user or users 24 may interact with an advertisement in this system. A viewer of a web page displaying an advertisement can submit comments concerning the advertisement, or the product or service to which the advertisement relates, or other related topics. Comments that are shown may include the time and date of the posting, and the name of the person who posted the comment, or other related information. (User ratings, and the number of comments, may also be available.) Once the user submits a comment, it can be submitted back to the ad server which can filter the comment. Comments can be in the form of textual comments, audio comments, video comments, and picture comments, or may be in other formats. Optionally, a user may be able to call a phone number and leave a comment pertaining to the advertisement. Surveys can also be distributed with an advertisement to add value to the comments.

User authentication may be an important factor in advertisement amending and commenting, and may be employed in such embodiments. Information tracking means such as cookies, for example, can also be incorporated by the system to provide valuable marketing information about system users. Tracking cookies may be used to track multiple user posts, how many advertisements were viewed, length of time spent on an advertisement, etc. These cookies may interact with the filter, which may use Bayesian filtering, to identify each individual's probability of posting spam. CAPTCHA and other authentication techniques can be implemented to prevent computer programs from artificially participating. Users may also be required to register with the ad server 21.

As websites may have varied formatting, various advertisement formats can be available. Advertisement sizes can also be made friendly for use on mobile devices by using a proper file format for mobile devices; in addition other client devices can be used, and proper file formats utilized accordingly.

A user who is a publisher viewing an advertisement can click a link to add that advertisement to their website.

Figure 3:
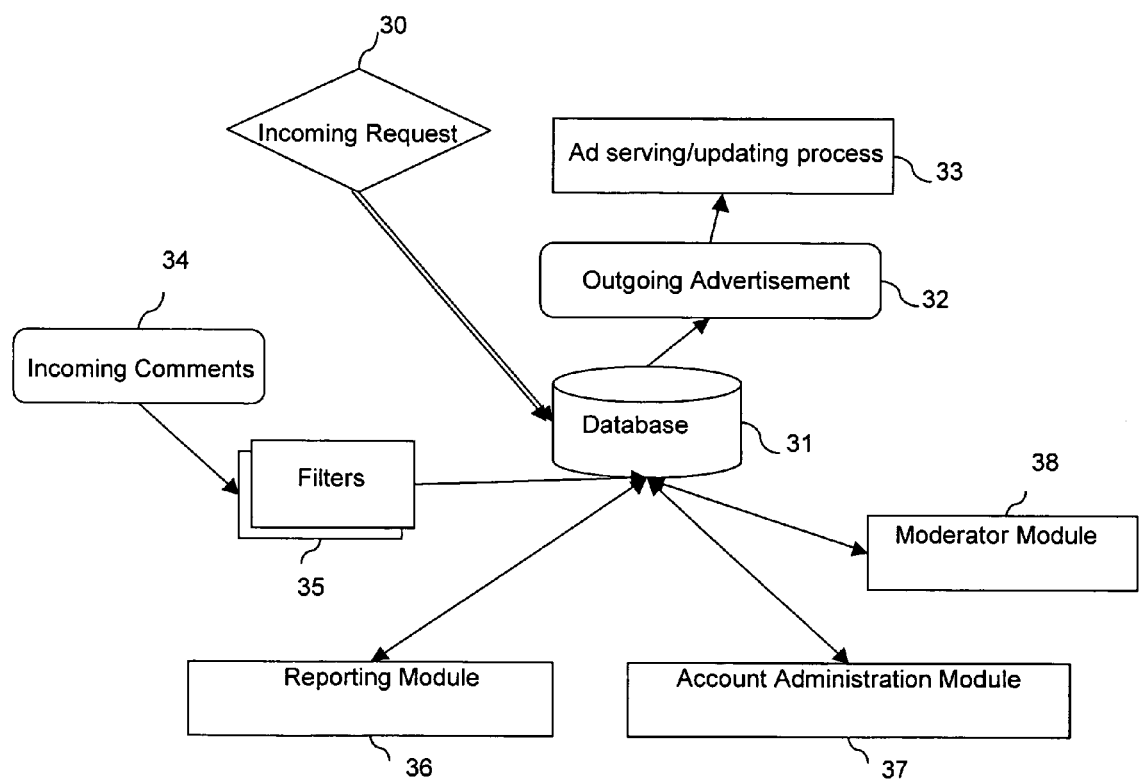
FIG. 3 is a chart of an exemplary advertising environment in which the present invention may operate.

As shown in FIG. 3, comments that are submitted directly from a web page displaying an advertisement 34 may be subjected to a filtering process. This process can scan the comments for vulgarity and off topic posts, or any other action deemed inappropriate, and such comments can be discarded. Comments that successfully pass through a filter 35 can be added to the database 31.

One or more filters 35, human or computer, can be used to determine which comments should be removed. Serial spammers or those who regularly comment with vulgar language could have their IP addresses banned from commenting. Certain posts can also be manually deleted. Some advertisers or other sponsors may elect to filter out unacceptable comments.

The comments that are stored in the database can be prepared for syndication as an outgoing advertisement 32. Multiple versions of this output can be generated based upon the website browser to render it. The embedded code in the publisher's website can call upon a content server to distribute this output to be rendered in a client-side application on a client device.

The actual advertisement scheduling process 33 is determined by the ad server. Code can be cut and pasted into the html of the web page where the advertisement is to be displayed. This code can call advertisements that the publisher previously approved, or use an automated selection.

The database 31, can also store and record sensitive information pertaining to the advertisements, or this information can be stored separately. Advertisers can create an account through an account administration module 37, where they can insert data for their advertisement.

The impetus for annotated content may be content from a third party database (e.g. a blog) or it can be content originated independent of a third party database. The advertisement can then be prepared by the ad server to be syndicated to publisher websites.

Advertisers, publishers, and third party database owners, in one embodiment, may modify all of their account settings from time to time. This may include items such as billing address, phone numbers, other contact information, and passwords. Payment information may also be changed as well through an account administration module 37. An advertiser may be able to assign different roles to those managing their campaigns, which may include, but are not limited to, creating new campaigns, moderating current campaigns, and managing billing information.

Advertisers can select various payment methods, such as CPM or CPC cost per comment. Various campaigns can be created, which can be limited by money, impressions, etc. A publisher or advertiser may elect to have the advertisements rotate.

Various methods such as human monitoring through a moderator module 38 and a computer filter may optionally be used to detect fraudulent clicks and prevent advertisers from being falsely charged.

The reporting module 36 can inform the publisher, the advertiser, and the $3^{rd}$ party database owner of various activities pertaining to a campaign. Advertisers can be enabled to view reports concerning, but not limited to, payment functions (CPM, CPC, CPA, cost per comment, etc), advertisement views and click-throughs. Publishers can be enabled to view similar reports. Their payment functions can be for how much they have made. Third party database owners can see comment views (how many times their comments were shown), and click-throughs to their website.

Human monitoring may be a part of the system. A moderator can log in to make sure content is on topic and suitable to be viewed by the relevant audience. This can also help to ensure a higher quality advertisement. A moderator is not limited to these duties and may also add comments and create incentives (perhaps of monetary value) for people to participate.

Various methods to prevent click fraud may be implemented, such as IP tracking, the use of session statistics (e.g., the time spent on a website-made possible by cookies), duplicate clicks, and conversion tracking. These methods may seek to detect and prevent website owners artificially trying to boost their website revenues (by clicking on an advertisement themselves), or the use of any automated advertisement clicking tools. Invalid clicks can also be monitored and/or reviewed by a system administrator or anyone with appropriate expertise. Advertisers can be credited for any invalid clicks (and publishers may not be paid for these clicks).

A table, which may include, but not be limited to, the basic table structure 4A and 4B shown in FIG. 4, can be linked to an advertisement to track vital statistics relating to the advertisement, including payment and other functions.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, can be made by those skilled in the art. Accordingly, it will be understood that the methods and systems disclosed herein are not to be limited to the embodiments disclosed herein, can include practices otherwise than specifically described, and are to be interpreted as broadly as allowed under the law.

What is claimed is:

1. A computerized method of adding content generated by a user to an advertisement, comprising:
   a) serving an advertisement within a Web page on each of a plurality of different Web sites, wherein the advertisement can accept user comments input by any user through a plurality of the Web pages on which the advertisement is served, and wherein at least one of the Web pages within which the advertisement is served includes content that is different from that of the Web pages within which the advertisement is served on other Web sites;
   b) receiving at least one user comment through at least one of the Web pages from a client device of a user who has viewed the advertisement on said client device on the Web page(s);
   c) combining the at least one user comment with the advertisement to create an annotated advertisement; and
   d) serving the annotated advertisement within the Web pages on a plurality of the Web sites, wherein at least one of the Web pages within which the annotated advertisement is served includes content that is different from that of the Web pages within which the annotated advertisement is served on the other Web sites.

2. The method of claim 1, wherein the at least one user comment is received from the user without the user leaving the Web page on which the user is viewing the advertisement.

3. The method of claim 1, further comprising applying a filtering process to the at least one user comment received prior to combining the user comment with the advertisement.

4. A method as in claim 1 further comprising receiving an election to receive messages from at least one user, and sending at least one message to said at least one electing user when a user comment is combined with the advertisement.

5. A method as in claim 1 wherein at least one user comment is a change to the advertisement.

6. A method as in claim 5, wherein the change to the advertisement is indicated by a modification of at least one property of a display of a portion of the advertisement comprising the user comment constituting the change.

7. A method as in claim 1 further comprising receiving an election to receive messages from at least one user, and sending at least one message to said at least one electing user when a user comment which satisfies a pre-defined set of rules is combined with the advertisement.

8. A method as in claim 1 wherein at least one user comment is tagged by category.

9. A method as in claim 1, further comprising receiving at least one user comment from a user whom at least one other user has invited to contribute a user comment to the annotated advertisement.

10. A method as in claim 1, further comprising receiving at least one user comment from a user which comprises a further user comment on at least one prior user comment.

11. A method as in claim 10 further comprising ranking the user comments.

12. The method of claim 3, wherein the filtering process uses at least one criterion selected from a group consisting of time, user, and context information.

13. The method of claim 1, wherein each user comment is of a type selected from the group consisting of audio, video, image, text, and computer code.

14. The method of claim 1, wherein at least one user client device is a personal computer.

15. The method of claim 1, wherein at least one user client device is a mobile device.

16. The method of claim 1, wherein at least one user client device is configured for the user to engage in a game.

17. The method of claim 1, wherein at least one user client device is configured for the user to send and receive instant messages.

18. The method of claim 1, wherein the at least one user comment is a modification of a user comment previously combined with the advertisement.

19. The method of claim 1, further comprising receiving at least one additional user comment from a client device of an additional user who has viewed the annotated advertisement on said client device on at least one of the Web pages.

20. The method of claim 19, further comprising combining the at least one additional user comment with the annotated advertisement; and serving the resulting further annotated advertisement within the Web page on each of the plurality of different Web sites.

21. A storage medium containing machine instructions readable by a computer system to configure the computer system to perform a method for creating an annotated advertisement, comprising:
   a) sending from an ad server to a Web page on each of a plurality of different Web sites an advertisement configured for display within a Web page on each of said sites for viewing on at least one client device, the advertisement configured to accept user comments relating thereto from at least one said client device and input by any user through a plurality of the Web pages on which the advertisement is served, and with at least one of the Web pages on each of a plurality of different Web sites having content that differs from that of the other Web pages;
   b) accepting at the ad server at least one user comment relating to the advertisement through at least one of the Web pages, said user comment having been sent from a client device by a user viewing the advertisement on said client device on at least one of said Web pages;
   c) appending at the ad server the at least one accepted user comment to the advertisement to create an annotated advertisement; and
   d) sending the annotated advertisement with the at least one accepted user comment appended from the ad server to a plurality of the Web sites to be displayed within a plurality of the Web pages having content that differs from that of other Web pages on which the annotated advertisement is displayed on said sites for viewing on at least one client device.

22. The storage medium of claim 21, wherein the at least one user comment is sent by the user without the user leaving the Web page on which the user is viewing the advertisement.

23. The storage medium of claim 21, wherein the storage medium further contains machine instructions readable by a computer system to configure the computer system to apply a filtering process to the at least one user comment prior to appending the comment to the advertisement.

24. The storage medium of claim 23, wherein the filtering process uses at least one criterion selected from a group consisting of time, user, and context information.

25. The storage medium of claim 21, wherein each user comment is of a type selected from the group consisting of audio, video, image, text, and computer code.

26. The storage medium of claim 21, wherein at least one accepted user comment is a modification of a user comment previously appended to the advertisement.

27. A storage medium containing machine instructions readable by a computer system to configure the computer system to perform a method of adding content generated by a user to an advertisement, comprising:
  a) serving an advertisement within a Web page on each of a plurality of different Web sites, wherein the advertisement can accept user comments input by any user through a plurality of the Web pages on which the advertisement is served, and where at least some of the Web pages within which the advertisement is served on at least one Web site includes content that is different from that of the Web pages within which the advertisement is served on the other Web sites;
  b) receiving at least one user comment through at least one of the Web pages from a client device of a user who has viewed the advertisement on said client device on the Web page(s);
  c) combining the at least one user comment with the advertisement to create an annotated advertisement; and
  d) serving the annotated advertisement within a plurality of the Web pages on a plurality of the Web sites, at least one of the Web pages within which the annotated advertisement is served having content that is different from that of the Web pages within which the annotated advertisement is served on other Web sites.

28. A computer-implemented method for providing an annotatable advertisement comprising:
  a) distributing the annotated advertisement to requesting web pages that have content for display to viewers of those web pages, wherein the content of at least one of the web pages is different from the content of at least one of the other web pages;
  b) providing an annotatable section in the annotated advertisement through which any of the viewers can submit a comment on any of a plurality of the web pages without leaving the web page being viewed;
  c) accepting at least one comment from at least one of the viewers through the annotatable section of the annotated advertisement on at least one of the web pages;
  d) updating the annotated advertisement to include the viewer's comment; and
  e) redistributing the updated annotated advertisement to additional web pages for display to subsequent viewers of the web pages, wherein at least one of the web pages within which the updated annotated advertisement is displayed includes content that is different from that of the other web pages within which the updated annotated advertisement is served.

29. The method of claim 28, wherein the updating of the annotated advertisement is based on at least one filter.

30. The method of claim 28, wherein the comment accepted from the viewer is in a form selected from at least one of a textual comment, an audio comment, a video comment, and a picture comment.

31. The method of claim 28, wherein the annotated advertisement includes content and is in a format that allows the viewers to edit the content of the annotated advertisement.

32. The method of claim 28, wherein the anotatable section includes a field.

* * * * *